United States Patent [19]
Chow et al.

[11] Patent Number: 5,804,326
[45] Date of Patent: Sep. 8, 1998

[54] INTEGRATED REACTANT AND COOLANT FLUID FLOW FIELD LAYER FOR AN ELECTROCHEMICAL FUEL CELL

[75] Inventors: Clarence Y. Chow, Vancouver; Boguslaw Wozniczka, Coquitlam; John Ka Ki Chan, Vancouver, all of Canada

[73] Assignee: Ballard Power Systems Inc., Burnaby, Canada

[21] Appl. No.: 770,321

[22] Filed: Dec. 20, 1996

[51] Int. Cl.$^6$ ............................................. H01M 008/04
[52] U.S. Cl. .............................. 429/26; 429/34; 429/39
[58] Field of Search ...................... 429/34, 39, 26

[56] References Cited

U.S. PATENT DOCUMENTS

| | | |
|---|---|---|
| 3,623,913 | 11/1971 | Adlhart et al. . |
| 3,940,285 | 2/1976 | Nickols, Jr. et al. . |
| 3,964,930 | 6/1976 | Reiser . |
| 4,699,853 | 10/1987 | Okada et al. . |
| 4,826,742 | 5/1989 | Reiser . |
| 5,069,985 | 12/1991 | Cohen et al. . |
| 5,230,966 | 7/1993 | Voss et al. . |
| 5,252,410 | 10/1993 | Wilkinson et al. . |
| 5,262,249 | 11/1993 | Beal et al. . |
| 5,407,758 | 4/1995 | Greiner et al. ............... 429/34 X |
| 5,464,700 | 11/1995 | Steck et al. . |
| 5,547,776 | 8/1996 | Fletcher et al. ............. 429/26 X |

FOREIGN PATENT DOCUMENTS

| | | |
|---|---|---|
| 61-260551 | 11/1986 | Japan . |
| 63-086270 | 4/1988 | Japan . |
| WO 96/00453 | 1/1996 | WIPO . |

*Primary Examiner*—John S. Maples
*Attorney, Agent, or Firm*—McAndrews, Held & Malloy, Ltd.

[57] ABSTRACT

An electrochemical fuel cell assembly comprises a pair of separator layers and a membrane electrode assembly interposed between the separator layers. The membrane electrode assembly comprises a pair of electrodes and an ion exchange membrane interposed therebetween, the electrodes having electrocatalyst associated therewith defining an electrochemically active area. Each of the separator layers comprises one or more reactant stream passages in fluid communication with one of the electrodes. At least one of the separator layers further comprises one or more coolant stream passages which do not superpose the electrochemically active area of the adjacent membrane electrode assembly, and are fluidly isolated from the reactant stream passages.

29 Claims, 6 Drawing Sheets

FIG. 7

INTEGRATED REACTANT AND COOLANT FLUID FLOW FIELD LAYER FOR AN ELECTROCHEMICAL FUEL CELL

FIELD OF THE INVENTION

The present invention relates to a compact cooling apparatus for an electrochemical fuel cell assembly. More particularly the present invention relates to solid polymer electrochemical fuel cell assemblies in which coolant and reactant stream passages are disposed in a common separator layer and the coolant stream passages do not superpose the electrochemically active area of the adjacent fuel cell.

BACKGROUND OF THE INVENTION

Electrochemical fuel cells convert fuel and oxidant to electricity and reaction product. Solid polymer electrochemical fuel cells generally employ a membrane electrode assembly ("MEA") comprising a solid polymer electrolyte or ion exchange membrane interposed between two electrodes. Each electrode includes electrocatalyst material, defining an electrochemically active area, to induce the desired electrochemical reaction in the fuel cell. The electrodes are electrically coupled to provide a path for conducting electrons between the electrodes through an external load.

In typical fuel cells, the MEA is disposed between two separator layers. Each separator layer typically comprises a substantially fluid impermeable electrically conductive separator plate and a layer of porous electrically conductive material interposed between the plate and the electrocatalyst-containing electrode. The porous electrically conductive material may be consolidated with the MEA. The plate acts as current collector and provides support for the membrane electrode assembly. Typically the plate is a fluid flow field plate with at least one flow passage formed therein to direct the fuel or oxidant to the respective electrode, namely, the anode on the fuel side and the cathode on the oxidant side. In some solid polymer fuel cells channels are not provided in the separator plate surfaces, and the reactants are directed through passages in the porous layer which, for example, may include channels or grooves formed in the porous layer or may be just be the interconnected pores or interstices of the porous material. Examples of such fuel cells are described in U.S. Pat. No. 5,252,410, which is incorporated herein by reference in its entirety.

At the anode, the fluid fuel stream moves through the porous layer and is oxidized at the anode electrocatalyst. At the cathode, the fluid oxidant stream moves through the porous layer and is reduced at the cathode electrocatalyst. The ion exchange membrane conducts ions from one electrode to the other and substantially isolates the fuel stream on the anode side from the oxidant stream on the cathode side.

Two or more fuel cells can be connected together, generally in series, but sometimes in parallel, to increase the overall power output of the assembly. Fuel cells are commonly electrically connected in series in fuel cell stacks by stacking individual fuel cell assemblies. In such series connected fuel cell stacks one side of a given separator plate can serve as an anode plate for one cell and the other side of the plate can serve as the cathode plate for the adjacent cell.

Figure 3A:
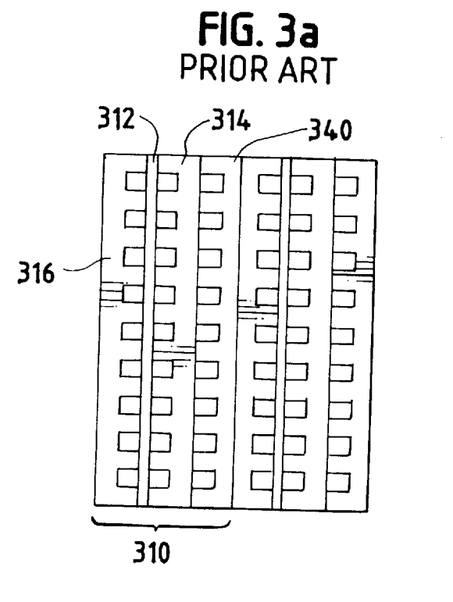
FIGS. 3a–c are side cross-sectional views showing three different configurations of repeating fuel cell units found in conventional (prior art) fuel cell stacks.
Figure 3B:
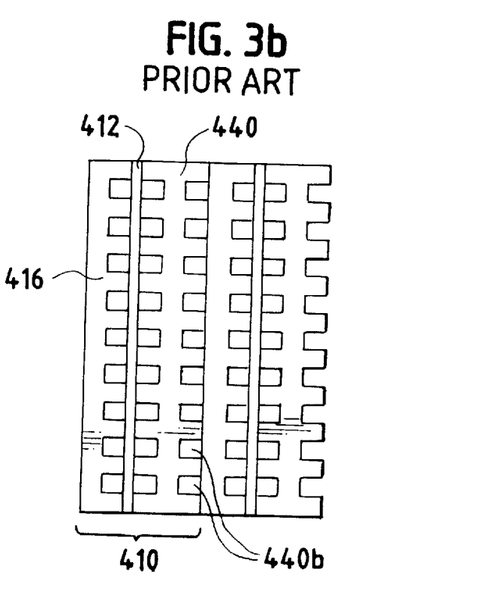

The electrochemical reaction which occurs in a fuel cell is generally exothermic and systems are provided for controlling the temperature of the fuel cell. In conventional solid polymer fuel cell stacks, cooling of the fuel cells is typically accomplished by providing cooling layers disposed between adjacent pairs of stacked fuel cells. Often the cooling layer is similar in design to a reactant flow field plate wherein a cooling fluid ("coolant"), typically water, is fed from an inlet manifold and directed across the cooling plate in channels to an outlet manifold. This type of fuel cell stack typically requires three plates between each adjacent MEA, namely, an anode plate, a cathode plate and a cooling plate, as shown in FIG. 3a. In some cases, it is possible to configure the coolant flow field on the reverse side of one of the reactant (anode or cathode) plates, in which case only two plates per repeating unit are required, as shown in FIG. 3b. However, such a double-sided configuration generally requires a thicker plate to substantially eliminate permeation of the coolant through the thickness of the plate into the reactant stream. Sometimes a cooling plate is incorporated between every other pair of fuel cells as shown in FIG. 3c.

Figure 3C:
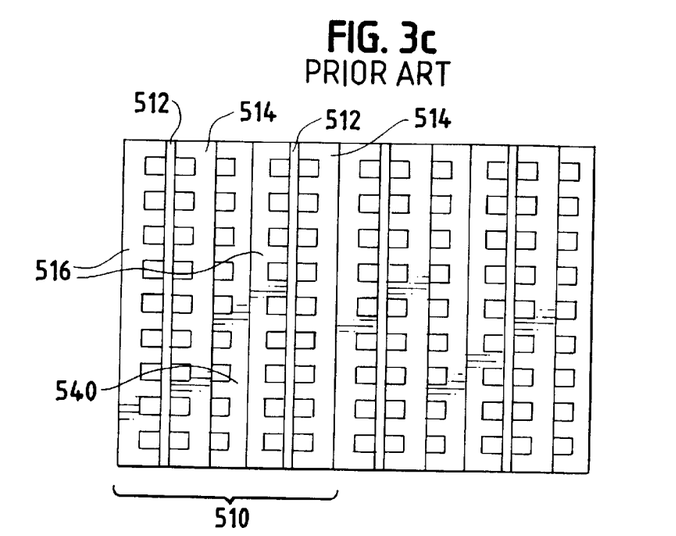

In each of the conventional arrangements illustrated in FIGS. 3a–c, the coolant flows in a different plane than the reactants, in passages which superpose the fuel cell electrodes and the reactant stream passages. (As used herein, the term "superpose" means to lay over and align with, but not necessarily in contact with.) In operation, heat generated in the fuel cells is drawn away from each fuel cell by the coolant through the thickness of the plates in the "z-direction", that is, perpendicular to the plane of the fuel cell assemblies. Heat is then transferred to and carried away by a circulating coolant.

It is desirable to increase the power density of fuel cell stacks by decreasing the volume and weight of each of the individual repeating fuel cell units of the stack. The present integrated reactant and coolant fluid flow field layer eliminates the separate cooling layers associated with conventional fuel cell stacks by incorporating the coolant stream passages in the same layer in which the reactant stream passages are provided. This approach allows the use of only one fluid flow field plate per fuel cell in a stack. This decreases the stack weight and volume, thereby increasing the power density of the stack, and also simplifies the manufacturability of the stack because only one type of fluid flow field plate is required.

SUMMARY OF THE INVENTION

An electrochemical fuel cell assembly with an integrated reactant and coolant fluid flow field layer comprises a pair of separator layers and a membrane electrode assembly interposed between the separator layers. The membrane electrode assembly comprises a pair of electrodes and an ion exchange membrane interposed therebetween, the electrodes having electrocatalyst associated therewith defining an electrochemically active area. Each of the separator layers comprises a reactant portion superposing the electrochemically active area and a remaining portion not superposing the electrochemically active area. Each of the separator layers also comprises a reactant stream inlet, a reactant stream outlet and at least one reactant stream passage in fluid communication with one of the electrodes for directing a fluid reactant stream from the reactant stream inlet to the reactant stream outlet. A predominant portion of the at least one reactant stream is passage disposed in the reactant portion of the separator layer. At least one of the separator layers further comprises at least one coolant stream inlet, at least one coolant stream outlet and at least one coolant stream passage for directing a coolant stream from the at least one coolant stream inlet to the at least one coolant stream outlet. The at least one coolant stream passage is disposed only in the remaining portion of the separator layer, and is fluidly isolated from the at least one reactant stream passage.

The separator layer may comprise one or more discrete layers of material. In preferred embodiments, at least one of the separator layers comprises a substantially fluid impermeable plate having oppositely facing major planar surfaces. Preferably the plate material is electrically conductive and substantially non-porous.

In preferred embodiments the at least one coolant stream passage extends parallel to the major planar surfaces of the plate. The at least one coolant stream passage may comprise at least one channel formed in one of the surfaces of the plate. Similarly, the at least one reactant stream passage may comprise at least one channel formed in one of the surfaces of the plate. Thus, the plate may have coolant channels or reactant channels or both formed therein.

In a further embodiment, the separator layer further comprises a porous layer interposed between the reactant portion of the substantially fluid impermeable plate and the membrane electrode assembly, and the at least one reactant stream passage comprises the interstices of the porous layer. The surface of the plate facing the porous layer may be substantially smooth or may have reactant stream channels formed therein, as described above. The porous layer may optionally have channels, grooves, perforations or other such structures formed therein to facilitate the flow of reactant between the reactant stream inlet and the outlet. Preferably the porous layer is electrically conductive. For example, suitable materials include carbon fiber paper and electrically conductive or non-conductive webs, meshes or fabrics preferably partially filled with electrically conductive material.

In a still further embodiment, the remaining portion of the separator layer may comprise the porous layer, and the at least one coolant stream passage may comprise a coolant stream conduit or hollow tube extending through the porous layer fluidly connecting the coolant stream inlet and the coolant stream outlet, the conduit or tube having substantially fluid impermeable walls. Alternatively the coolant passages may comprise the interstices of the porous layer (thus the coolant may flow in the porous layer) provided the coolant passages are disposed only in the remaining portion and are fluidly isolated from the reactant passages.

In the embodiments described, above the coolant and reactant stream inlets and outlets may, for example, comprise openings formed in the separator layers (internal manifold openings) or may comprise the interface between the edges of the separator layers and external manifolds attached to the edges of the separator layers.

In alternative embodiments the at least one coolant stream passage extends through the plate of the separator layer from one of its major planar surfaces to the other, the at least one coolant stream passage extending substantially perpendicular to its major planar surfaces. Thus, there is at least one opening extending through the thickness of the remaining portion of separator layer through which a coolant stream is directed. The remaining portion may comprises a plurality of noncontiguous regions, some of which are surrounded by reactant portion.

An electrochemical fuel cell stack comprising integrated reactant and coolant fluid flow field layers comprises a plurality of fuel cells and a separator layer interposed between each pair of adjacent fuel cells. Each of the fuel cells comprises a membrane electrode assembly comprising a pair of electrodes and an ion exchange membrane interposed therebetween, the electrodes having electrocatalyst associated therewith defining an electrochemically active area. Each of the separator layers comprises a reactant portion superposing the electrochemically active area of the pair of fuel cells on either side of it, and a remaining portion not superposing the electrochemically active area. Each of the separator layers also comprises a first reactant stream inlet, a first reactant stream outlet and at least one first reactant stream passage in fluid communication with an electrode of a first fuel cell of the pair of fuel cells, for directing a first reactant stream from the first reactant stream inlet to the first reactant stream outlet, a predominant portion of the at least one first reactant stream passage disposed in the reactant portion. Each of the separator layers further comprises a second reactant stream inlet, a second reactant stream outlet and at least one second reactant stream passage, in fluid communication with an electrode of a second fuel cell of the pair of fuel cells, for directing a second reactant stream from the second reactant stream inlet to the second reactant stream outlet, a predominant portion of the at least one second reactant stream passage disposed in the reactant portion. Each of the separator layers further comprises at least one coolant stream inlet, at least one coolant stream outlet and at least one coolant stream passage for directing a coolant stream from the at least one coolant stream inlet to the at least one coolant stream outlet, wherein the at least one coolant stream passage is disposed only in the remaining portion of the separator layer, and is fluidly isolated from the first and second reactant stream passages.

The separator layers may each comprise one or more discrete layers of material interposed between each pair of adjacent fuel cells. In a preferred embodiment, each separator layer comprises a substantially fluid impermeable plate having oppositely facing major planar surfaces.

In preferred embodiments, the at least one coolant stream passage extends substantially parallel to the major planar surfaces of the plate. The coolant stream passages may comprise channels formed in one or both surfaces of the plate. The at least one first reactant stream passage may comprise at least one channel formed in one of the surfaces of the plate and the at least one second reactant stream passage may comprise at least one channel formed in the oppositely facing surface of the plate.

As described in more detail above, the separator layer may further comprise a porous layer interposed between the plate and the first fuel cell, and the at least one first reactant stream passage comprises the interstices of the porous layer. The remaining portion of the separator layer may also comprise the porous layer, and the at least one coolant stream passage may comprise a coolant stream conduit extending through the porous layer fluidly connecting the coolant stream inlet and the coolant stream outlet. Alternatively the coolant passages may comprise the interstices of the porous layer provided the coolant passages are disposed only in the remaining portion and are fluidly isolated from the reactant passages.

In alternative embodiments the at least one coolant stream passage extends through the plate of each separator layer from one of its major planar surfaces to the other, the at least one coolant stream passage extending substantially perpendicular to its major planar surfaces. Thus, aligned openings extending through the thickness of the remaining portion of each of the separator layers in the stack form passages through which a coolant stream is directed. The remaining portion of each separator layer may comprise a plurality of noncontiguous regions, some of which are surrounded by the reactant portion of the separator layer, so that coolant passages may extend perpendicularly through the active area of the membrane electrode assemblies.

In any of the embodiments described above the fuel cell assembly may be a "plaque" assembly in which two or more membrane electrode assemblies are arranged in a plane in a side-by-side relationship (juxtaposed). In this case the reactant portion of each separator layer comprises a plurality of noncontiguous regions, each region superposing the electrochemically active area of one of the juxtaposed membrane electrode assemblies.

In some embodiments, it may be desirable that the remaining portion of the separator layer be electrically isolated from the reactant portion of the separator layer.

In any of the embodiments described above the coolant may be a liquid or a gas. Suitable coolants include water and air. Other suitable coolants include, but are not limited to, glycol-containing liquids and dielectric fluids, such as mineral oils and silicone oils.

DETAILED DESCRIPTION OF THE PREFERRED EMBODIMENTS

Figure 1A:
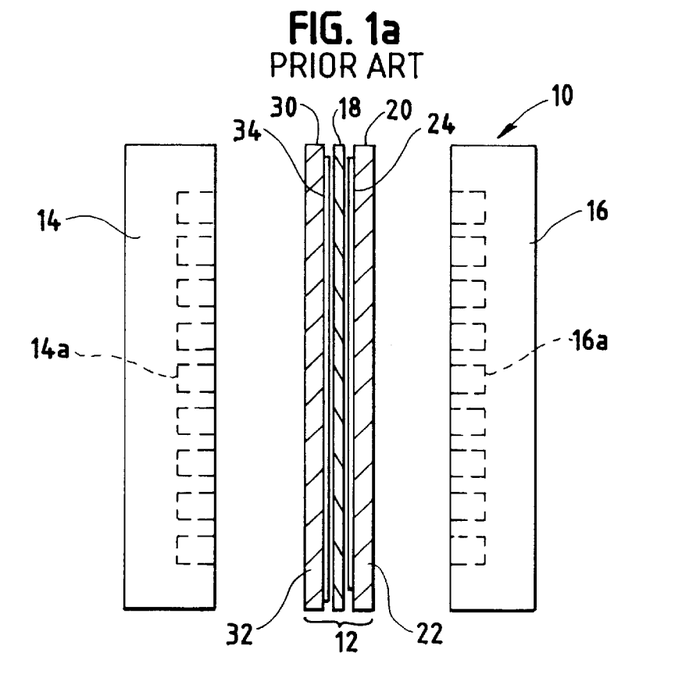
FIG. 1a is a side cross-sectional view of a conventional (prior art) electrochemical fuel cell assembly comprising a pair of fluid flow field plates.

Turning first to FIG. 1a, a conventional (prior art) electrochemical fuel cell assembly 10 includes membrane electrode assembly 12 interposed between substantially fluid impermeable plates 14 and 16. Membrane electrode assembly 12 consists of an ion exchange membrane 18 interposed between two electrodes, namely anode 20 and cathode 30. In conventional fuel cells, anode 20 and cathode 30 each include a layer of porous electrically conductive material 22 and 32, such as, for example, carbon fiber paper or carbon cloth, which has electrocatalyst material associated therewith. The electrocatalyst material is commonly disposed in a thin layer 24 and 34 on the surfaces of the electrodes 20 and 30 at the interface with the membrane 18. The location of the electrocatalyst defines the electrochemically active area of fuel cell assembly 10. Plates 14 and 16 each have at least one open-faced channel, 14a and 16a respectively, formed in the surface facing the membrane electrode assembly 12. When assembled against the cooperating surfaces of the electrodes 20 and 30, channels 14a and 16a define reactant flow passages for fluid oxidant and fuel streams, respectively.

Figure 1B:
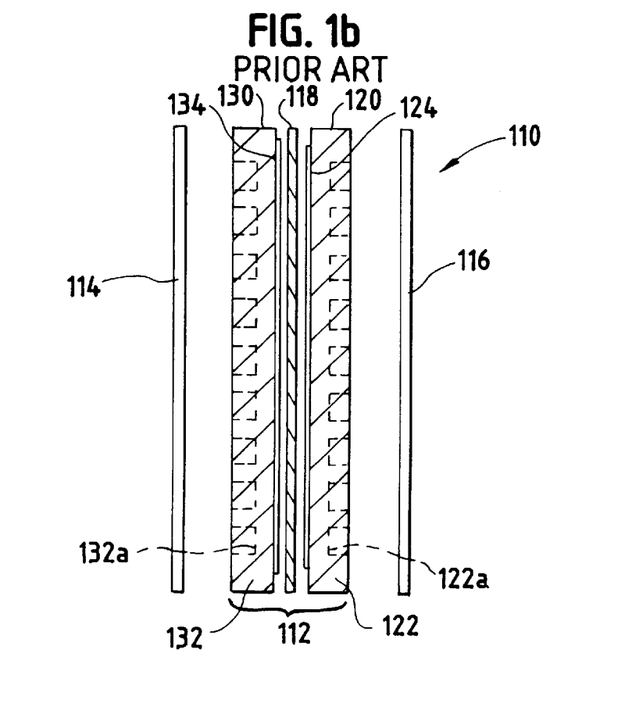
FIG. 1b is a side cross-sectional view of a conventional (prior art) electrochemical fuel cell assembly comprising a pair of separator plates with reactant channels formed in layers of porous electrically conductive sheet material.

FIG. 1b shows a conventional (prior art) electrochemical fuel cell assembly 110 including membrane electrode assembly 112 interposed between substantially fluid impermeable plates 114 and 116. Membrane electrode assembly 112 consists of an ion exchange membrane 118 interposed between two electrodes, namely anode 120 and cathode 130 which each include a layer of porous electrically conductive material 122 and 132 and a thin layer of electrocatalyst material 124 and 134. Plates 114 and 116 have substantially smooth surfaces. Porous layers 122 and 132 optionally have grooves or channels, 122a and 132a respectively, formed in the surface facing the plates 114 and 116. When assembled against the cooperating surfaces of the plates 114 and 116, channels 132a and 122a define reactant flow passages for fluid oxidant and fuel streams respectively. Fluid reactant streams can also flow within the interstices of porous layers 122 and 132.

Figure 2:
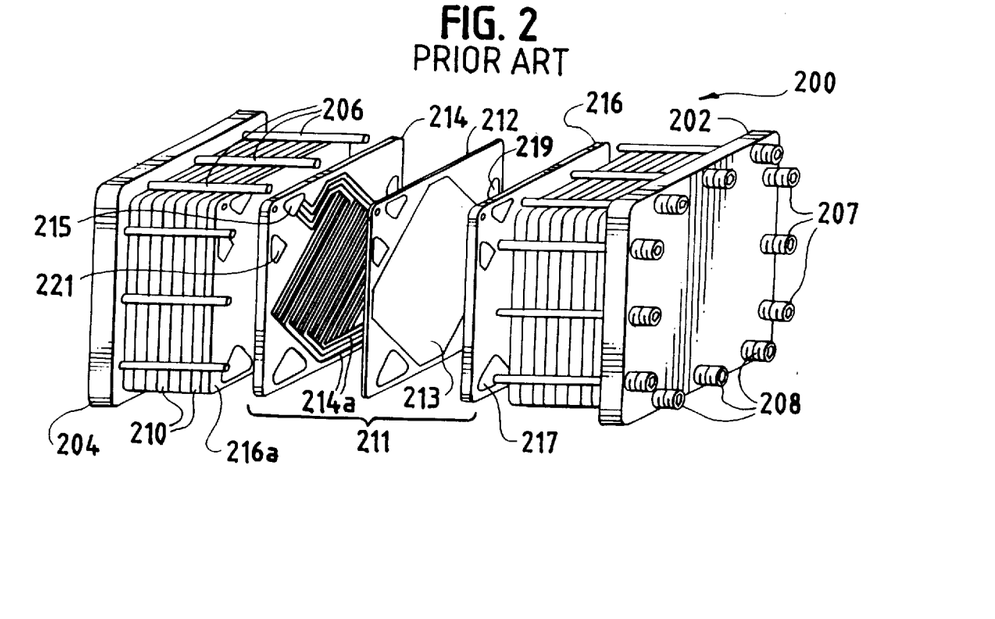
FIG. 2 is a partially exploded isometric view of a conventional (prior art) solid polymer fuel cell stack showing a membrane electrode assembly interposed between two fluid flow field plates.

FIG. 2 illustrates a conventional (prior art) fuel cell stack 200, including a pair of end plate assemblies 202 and 204, and a plurality of stacked fuel cell assemblies 210. Tie rods 206 extend between end plate assemblies 202 and 204 to retain and secure the stack 200 in its assembled state with fastening nuts 207. Springs 208 threaded on the tie rods 206 interposed between the fastening nuts 207 and the end plate assembly 202 apply resilient compressive force to the stack in the longitudinal direction. Fluid reactant and coolant streams are supplied to and exhausted from internal manifolds and passages in the stack 200 via inlet and outlet ports (not shown) in end plate assembly 204.

Details of the repeating unit 211 of individual fuel cell assemblies 210 which make up the stack 200 is shown in exploded form in FIG. 2. Each fuel cell assembly 210 includes a cathode flow field plate 214, an anode flow field plate 216, and a membrane electrode assembly 212 interposed between plates 214 and 216. Membrane electrode assembly 212 consists of an ion exchange membrane interposed between two electrodes, namely an anode and a cathode (detail not shown). The electrochemically active area 213 of the membrane electrode assembly 212 has electrocatalyst (not shown) disposed at both the membrane-electrode interfaces. Cathode flow field plate 214 has a plurality of open-faced channels 214a formed in the surface facing the membrane electrode assembly 212. The channels 214a traverse the portion of the plate 214 which superposes the electrochemically active area 213, and extend from an oxidant stream inlet manifold opening 215 to an oxidant stream outlet manifold opening (not shown) formed in the diagonally opposite corner of the plate 214. Similarly, anode flow field plate 216 has a plurality of open-faced channels (not shown) formed in the surface facing the membrane electrode assembly 212, extending from a fuel stream inlet manifold opening 217 to a fuel stream outlet manifold opening 219 and traversing the portion of the plate 216 which superposes the electrochemically active area 213.

Cathode plate 214 also has a plurality of open-faced channels (not shown) formed in the oppositely facing surface thereof (facing away from the membrane electrode assembly 212). When assembled against the cooperating surface of the next anode fluid flow field plate 216a, the channels define coolant flow passages, for directing a coolant stream from an inlet manifold opening 221 to an outlet manifold opening (not shown), which traverse the portion of the plate 214 which superposes the electrochemically active area 213.

When the stack 200 is secured in its assembled, compressed state the internal fuel, oxidant and coolant manifolds and passages are typically fluidly isolated from one another by seals on the plates and/or on the membrane electrode assemblies.

FIGS. 3a–c are side cross-sectional views showing three examples of configurations of fuel cell assembly repeating units found in conventional (prior art) fuel cell stacks. FIG. 3a illustrates a configuration in which three plates are employed per membrane electrode assembly. Each fuel cell assembly repeating unit 310 includes a membrane electrode assembly 312 interposed between a pair of substantially fluid impermeable, oxidant and fuel fluid flow field plates 314 and 316 respectively. A coolant fluid flow field plate 340 is interposed between each fuel and oxidant fluid flow field plate. FIG. 3b illustrates a configuration in which two plates are employed per membrane electrode assembly, as in fuel cell stack 200 illustrated in FIG. 2. Each fuel cell assembly repeating unit 410 includes a membrane electrode assembly 412 interposed between a substantially fluid impermeable fuel fluid flow field plate 416 and a combined oxidant-coolant fluid flow field plate 440 which is also preferably substantially fluid impermeable. Coolant passages 440b are provided on the face of plate 440 facing away from membrane electrode assembly 412. In the configuration shown in FIG. 3c each membrane electrode assembly 512 is interposed between a pair of substantially fluid impermeable, oxidant and fuel fluid flow field plates 514 and 516 respectively. A coolant fluid flow field plate 540 is interposed between every other pair of oxidant and fuel fluid flow field plates 514 and 516. Thus each fuel cell assembly repeating unit 510 includes two membrane electrode assemblies 512, two oxidant fluid flow field plates 514, two fuel fluid flow field plates 516 and a single coolant fluid flow field plate 540. In each of the conventional arrangements described above and illustrated in FIGS. 3a–c, distinct "cooling layers" are provided in the stacked assemblies and the coolant stream flows in a different plane than the reactants, in passages which superpose the fuel cell electrodes and the reactant passages. In these conventional arrangements, if the plate material separating the reactant and coolant stream passages is not sufficiently thick, and is slightly fluid permeable or has a defect in it, the coolant and reactant fluids may contact each other which is generally undesirable. Further, the coolant may contact the electrocatalyst of the fuel cell membrane electrode assembly, which can be detrimental to performance and can cause damage to the fuel cells, particularly if the coolant is other than water or air.

Figure 4:
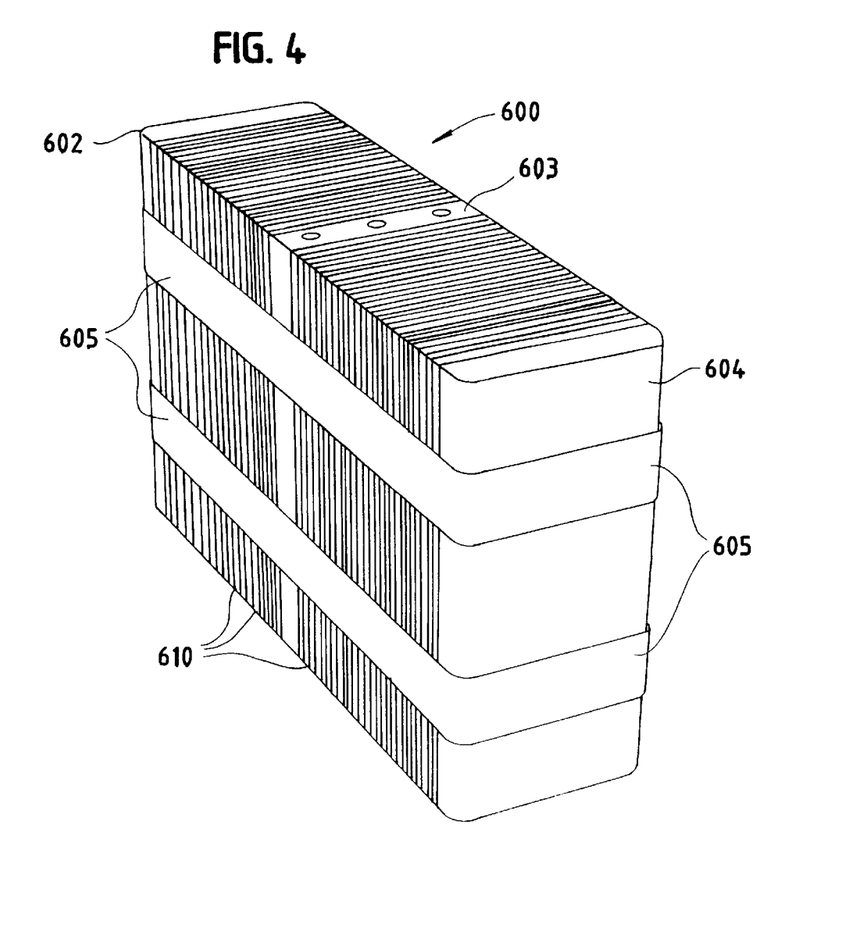
FIG. 4 is an isometric view of a fuel cell stack with an integrated reactant and coolant fluid flow layer interposed between adjacent pairs of fuel cell plaque assemblies.

FIG. 4 shows a fuel cell stack 600 in which the individual stacked fuel cell assemblies include an integrated reactant and coolant fluid flow field layer. Fuel cell stack 600 includes end plate assemblies 602 and 604 and a plurality of fuel cell assemblies 610 interposed between the end plate assemblies 602, 604. Each fuel cell assembly includes a single fluid flow field plate which has fuel stream passages formed in one face, oxidant stream passages formed in the other face, and coolant stream passages formed in both faces (see FIG. 5). Compression bands 605 extend tightly around the end plate assemblies 602, 604 and fuel cell assemblies 610 to retain and secure stack 600 in its assembled state. In the illustrated embodiment of a fuel cell stack 600, fluid reactants and coolant are supplied to and exhausted from internal manifolds and passages in the stack 600 via a central fluid distribution plate 603.

Figure 5:
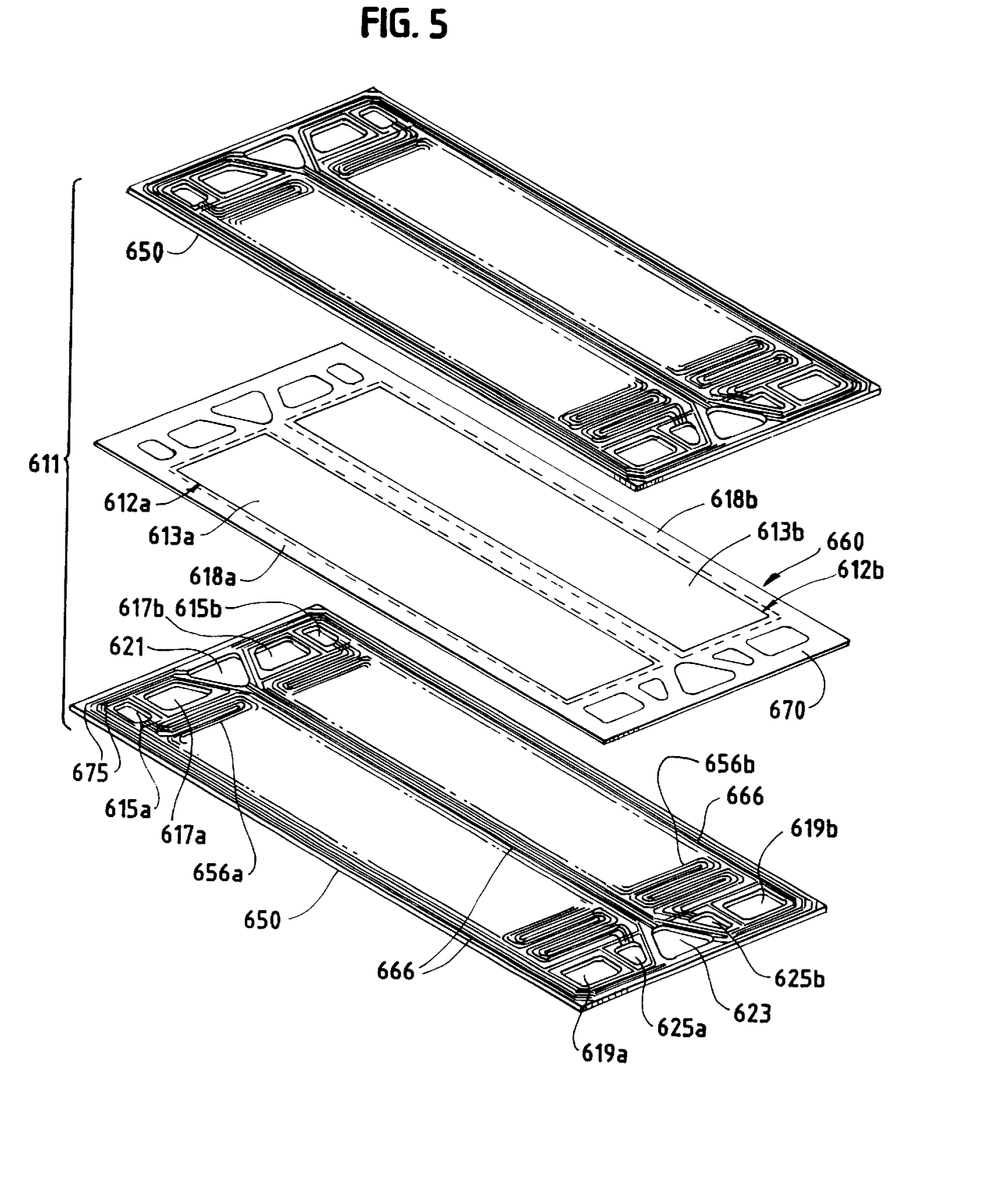
FIG. 5 is an exploded isometric view of a portion of the fuel cell stack of FIG. 4.

FIG. 5 is an exploded isometric view of a portion of fuel cell stack 600 of FIG. 4 showing the repeating unit 611. A plaque fuel cell assembly 660 is interposed between two substantially identical fluid flow field plates 650. Plaque fuel cell assembly 660 includes two membrane electrode assemblies 612a and 612b arranged in the same plane in a side-by-side relationship (juxtaposed). Membrane electrode assemblies 612a, 612b each include an ion exchange membrane interposed between two porous electrically conductive electrode layers, namely an anode and a cathode (detail not shown). The electrochemically active areas 613a, 613b of the membrane electrode assemblies 612a, 612b respectively have electrocatalyst (not shown) disposed at both the membrane-electrode interfaces. Preferably the ion exchange membranes extend only slightly beyond electrochemically active areas 613a, 613b as shown by broken lines 618a, 618b. Preferably membrane electrode assemblies 612a, 612b are surrounded by a multi-layer plastic frame or gasket 670. Examples of gasketted membrane electrode assemblies are described in U.S. Pat. No. 5,464,700, which is incorporated herein by reference in its entirety.

The upper surface (as shown in FIG. 5) of each of fluid flow field plates 650 has two sets of open-faced channels 656a, 656b formed in it. The sets of channels 656a, 656b each traverse a portion of the plate 650 which superposes the electrochemically active area 613a, 613b respectively. Channels 656a extend from oxidant stream inlet manifold opening 615a to oxidant stream outlet manifold opening 625a to direct an oxidant stream in fluid communication with the electrode (cathode) on the lower face of adjacent membrane electrode assembly 612a. Similarly, channels 656b extend from oxidant stream inlet manifold opening 615b to oxidant stream outlet manifold opening 625b to direct an oxidant stream in fluid communication with the electrode on the lower face of adjacent membrane electrode assembly 612b.

The lower surface (as shown in FIG. 5) of each of fluid flow field plates 650 also has two similar sets of open-faced channels in it (not shown). The first set extends from fuel stream inlet manifold opening 617a to fuel stream outlet manifold opening 619a to direct a fuel stream in fluid communication with the electrode (anode) on the upper face of the adjacent membrane electrode assembly (not shown) of the next repeating unit. The second set of channels extends from fuel stream inlet manifold opening 617b to oxidant stream outlet manifold opening 619b to direct a fuel stream in fluid communication with the electrode on the upper face of the adjacent membrane electrode assembly. Thus, the first and second sets of fuel stream channels traverse a portion of the plate 650 which superposes the electrochemically active area 613a, 613b respectively.

In the illustrated embodiment, both surfaces of each plate 650 are provided with coolant stream channels 666 which extend from coolant stream inlet manifold opening 621 to coolant stream outlet manifold opening 623 and are disposed in the portion of the plate 650 which does not superpose electrochemically active areas 613a, 613b. Plates 650 are substantially fluid impermeable and in the assembled fuel cell stack 600 the fuel, oxidant and coolant manifolds and passages are typically fluidly isolated from one another by various sealing mechanisms. For example, seals 675 on each of plates 650 cooperate with the adjacent plastic frame 670 of the fuel cell plaque assembly 660 to fluidly isolate coolant flowing in channels 666 from oxidant flowing in channels 656a, 656b. In the illustrated embodiment eight fluid manifold openings corresponding to those formed in each of plates 650 are formed in the plastic frame 670. In the assembled stack, the aligned fluid manifold openings form internal manifolds or headers for supply and exhaust of reactant and coolant fluids.

Preferably plates 650 are electrically conductive so that juxtaposed anodes and cathodes of membrane electrode assemblies 612a, 612b in the same fuel cell plaque assembly 610 will be electrically connected in parallel by the plate, and superposed cells in adjacent stacked plaque assemblies will be electrically connected in series (from one layer to the next), by the plate. With respect to the manifolding of reactant fluids, in the embodiment illustrated in FIG. 5 separate reactant supply and exhaust headers are provided for each cell in the plaque. Superposed cells in adjacent stacked plaque assemblies are supplied with reactants (in parallel) via a common header. There are many alternative ways of electrically connecting, fluidly connecting and supplying reactants to fuel cells arranged in stacked plaque assemblies, some of which are described in U.S. Pat. Nos. 4,699,853 and 5,069,985, which are incorporated herein by reference in their entireties.

Figure 6:
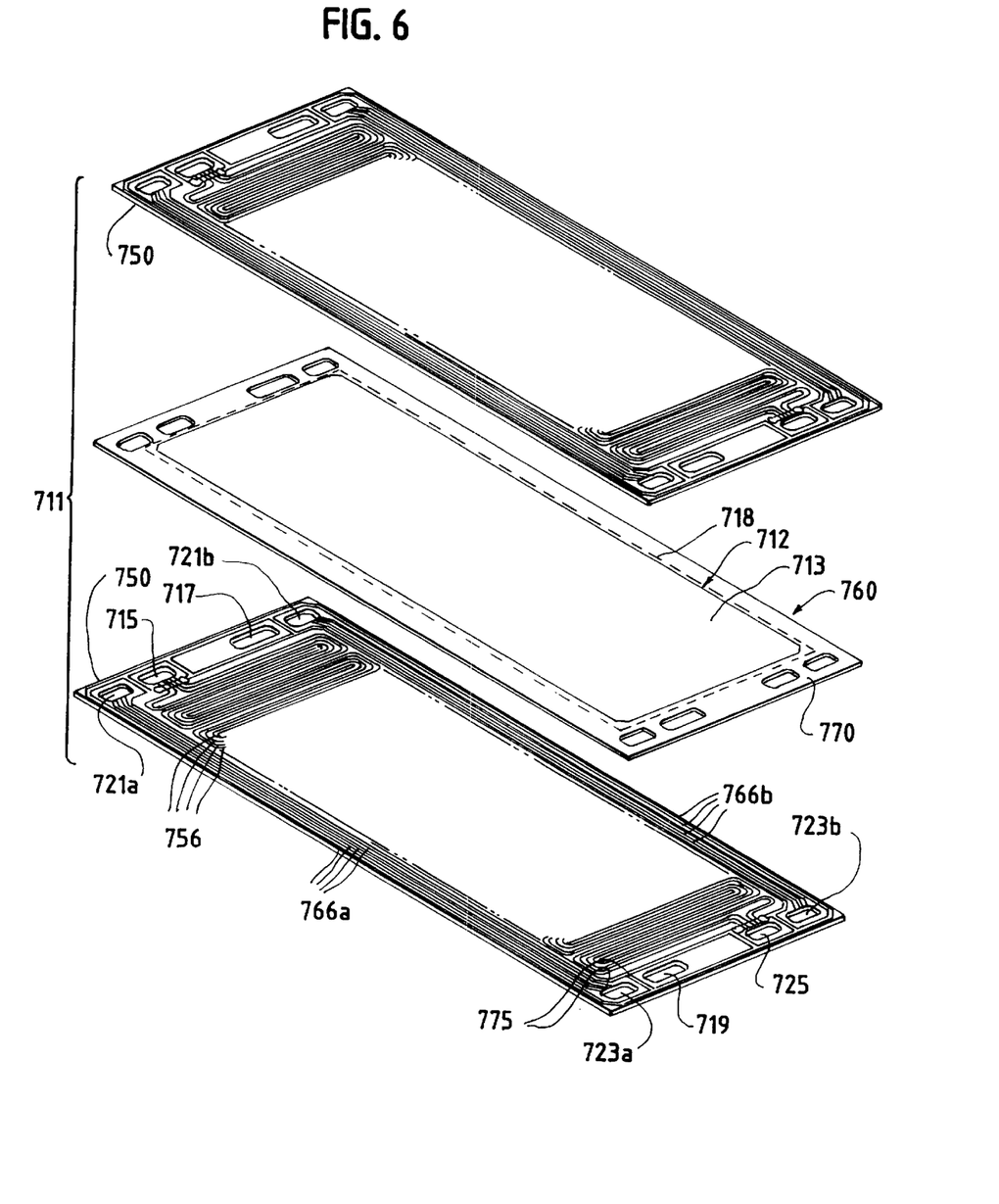
FIG. 6 is an exploded isometric view of a portion of a fuel cell stack with a single integrated reactant and coolant fluid flow layer interposed between adjacent fuel cell membrane electrode assemblies.

FIG. 6 is an exploded isometric view of a portion of a fuel cell stack (similar to stack 600 of FIGS. 4–5) showing the repeating unit 711. A fuel cell assembly 760 is interposed between two substantially identical fluid flow field plates 750. Fuel cell assembly 760 includes a single membrane electrode assembly 712 including an ion exchange membrane interposed between two porous electrically conductive electrode layers, namely an anode and a cathode (detail not shown). The electrochemically active area 713 of the membrane electrode assembly 712 has electrocatalyst (not shown) disposed at both the membrane-electrode interfaces. Preferably the ion exchange membrane extends only slightly beyond the electrochemically active area 713 as shown by broken lines 718. Preferably the membrane electrode assembly 712 is surrounded by a multi-layer plastic frame or gasket 770.

The upper surface (as shown in FIG. 6) of each of fluid flow field plates 750 has a plurality of open-faced channels 756 formed in it. The channels 756 traverse a portion of the plate 750 which superposes the electrochemically active area 713. Channels 756 extend from oxidant stream inlet manifold opening 715 to oxidant stream outlet manifold opening 725 to direct an oxidant stream in fluid communication with the electrode (cathode) on the lower face of adjacent membrane electrode assembly 712. The lower surface (as shown in FIG. 6) of each of fluid flow field plates 750 also has similar open-faced channels in it (not shown), extending from fuel stream inlet manifold opening 717 to fuel stream outlet manifold opening 719, to direct a fuel stream in fluid communication with the electrode (anode) on the upper face of the adjacent membrane electrode assembly. The fuel stream channels also traverse a portion of the plate 750 which superposes the electrochemically active area 713.

In the illustrated embodiment, both surfaces of each plate 750 are provided with coolant stream channels 766a, 766b which extend from coolant stream inlet manifold openings 721a, 721b to coolant stream outlet manifold openings 723a, 723b respectively, and are disposed in the portion of the plate 750 which does not superpose the electrochemically active area 713. Plates 750 are substantially fluid impermeable and in the assembled fuel cell stack the fuel, oxidant and coolant manifolds and passages are typically fluidly isolated from one another by various sealing mechanisms. For example, seals 775 on each of plates 750 cooperate with the adjacent plastic frame 770 of the fuel cell assembly 760 to fluidly isolate coolant flowing in channels 766a, 766b from oxidant flowing in channels 756. In the illustrated embodiment fluid manifold openings corresponding to those formed in each of plates 750 are formed in the plastic frame 770. In the assembled stack, the aligned fluid manifold openings form internal manifolds or headers for supply and exhaust of reactant and coolant fluids.

Again, preferably plates 750 are electrically conductive so that the cells in adjacent stacked fuel cell assemblies will be electrically connected in series (from one layer to the next), by the plate.

Figure 7:
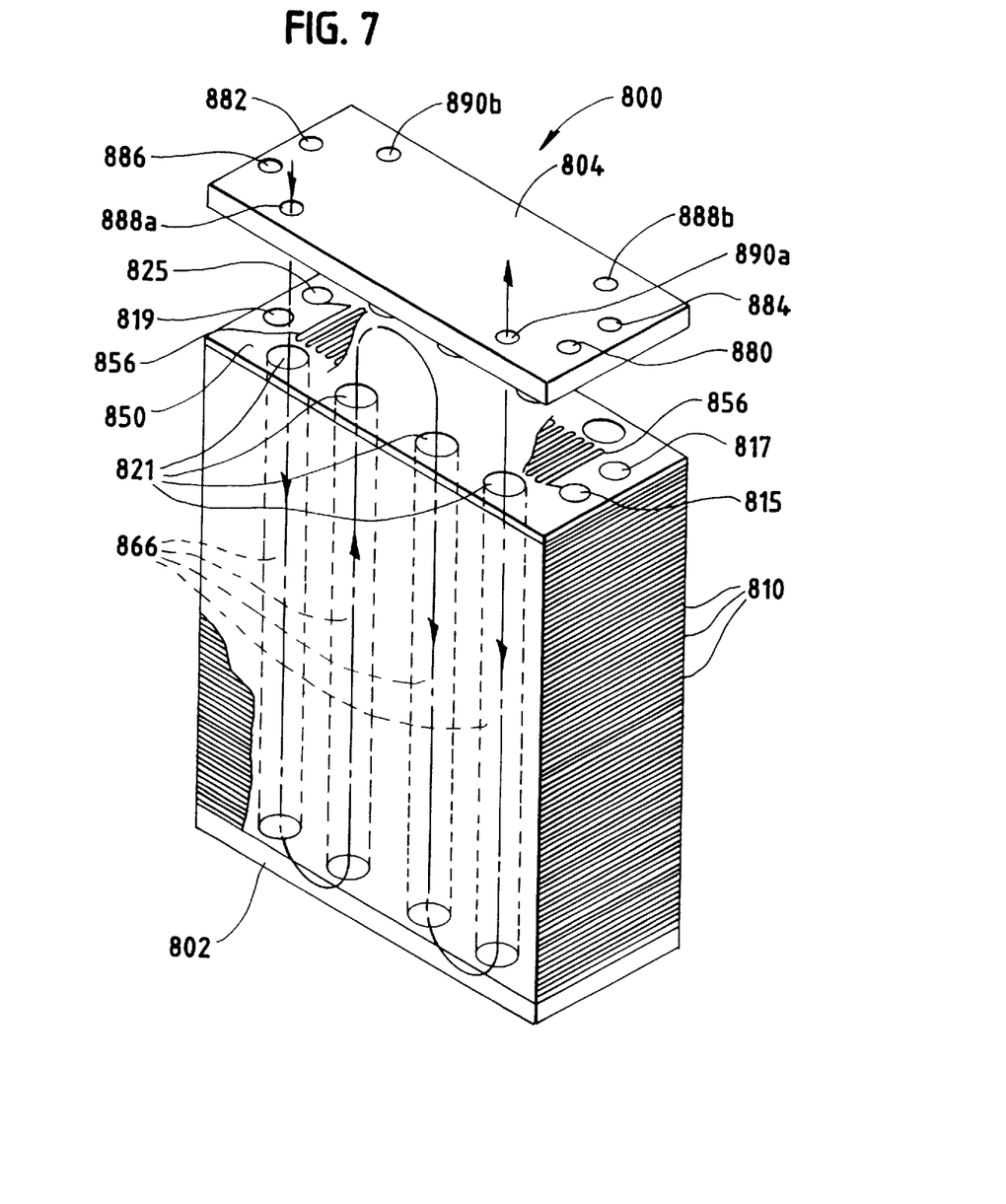
FIG. 7 is an partially exploded, schematic, isometric view of a fuel cell stack with an integrated reactant and coolant fluid flow layer interposed between adjacent pairs of fuel cell membrane electrode assemblies, where the coolant stream passages extend through the stack substantially perpendicular to the major planar surfaces of the stacked assemblies.

In the embodiments illustrated in FIGS. 4–6 described above, coolant stream passages extend substantially parallel to the major planar surfaces of the plate and to the major planar surfaces of the membrane electrode assemblies. FIG. 7 shows a simplified schematic isometric view of a fuel cell stack 800 in which coolant stream passages extend through the thickness of each separator layer from one of its major planar surfaces to the other, the coolant stream passages thus extending substantially perpendicular to its major planar surfaces.

Fuel cell stack 800 includes end plate assemblies 802 and 804 and a plurality of fuel cell assemblies 810 interposed between the end plate assemblies 802, 804. Each repeating unit fuel cell assembly 810 includes a single fluid flow field plate and a membrane electrode assembly (detail not shown). The upper surface (as shown in FIG. 7) of each fluid flow field plate of repeating units 810 has at least one open-faced oxidant stream channel formed in it which traverses a portion of the plate which superposes the electrochemically active area of the adjacent membrane electrode assembly. A portion of such an oxidant stream channel 856 is shown in plate 850, extending from oxidant stream inlet manifold opening 815 to oxidant stream outlet manifold opening 825. The lower surface (as shown in FIG. 7) of each of fluid flow field plates 850 also has similar open-faced channels in it (not shown), extending from fuel stream inlet manifold opening 817 to fuel stream outlet manifold opening 819. In the assembled stack, the aligned reactant fluid manifold openings form internal manifolds or headers for supply and exhaust of reactants to the channels in the fluid flow field plates. The fluid reactant streams are supplied to and exhausted from these internal manifolds via oxidant inlet and outlet ports 880 and 882 respectively, and fuel inlet and outlet ports 884 and 886 respectively, in end plate assembly 804.

In the illustrated fuel cell stack 800, the surfaces of the fluid flow field plates 850 do not have coolant stream channels formed therein. Aligned openings 821 extending through the thickness of the repeating units 810 form interconnected coolant passages 866 through which a coolant stream is directed substantially perpendicular to the major planar surfaces of the stacked assemblies 810. Thus, coolant stream passages extend through each separator layer, from a coolant stream inlet on one of its major planar surfaces to a coolant stream outlet on the other major planar surface, and are disposed in the portion of the layer which does not superpose the electrochemically active area of the adjacent membrane electrode assemblies. The passages 866 also preferably extend through a plastic frame surrounding each membrane electrode assembly. In the illustrated embodiment the coolant passages 866 are configured so that the coolant is directed up and down through the stack in four passes on two sides of the stack. The end plate assemblies 802, 804 are designed to redirect the coolant up and down through the stack as indicated by the arrows in FIG. 7.

The coolant stream is supplied to and exhausted from these passages via coolant inlet ports, 888a, 888b, and coolant outlet ports, 890a, 890b, in end plate assembly 804.

Again the plates 850 are preferably substantially fluid impermeable and in the assembled fuel cell stack the fuel, oxidant and coolant manifolds and passages are typically fluidly isolated from one another by various sealing mechanisms (not shown). Preferably plates 850 are also electrically conductive so that the cells in adjacent stacked fuel cell assemblies will be electrically connected in series (from one layer to the next), by the plate.

In the embodiments illustrated in FIGS. 4–7 and described above, preferably the fluid flow field plates are highly thermally conductive so that heat is conducted laterally through the plate from the region superposing the electrochemically active area of the membrane electrode assemblies to the region having coolant stream passages formed therein.

In practice, the shape and dimensions of membrane electrode assemblies and the configuration of the reactant and coolant stream passages are selected so that, in operation, adequate cooling is obtained across the entire electrochemically active area of each fuel cell in a fuel cell stack. The preferred design depends on many factors including preferred operating conditions, the thermal conductivity of the separator layer materials, the nature of the coolant, and the power and voltage requirements.

While particular elements, embodiments, and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. An electrochemical fuel cell assembly comprising:
   a pair of separator layers;
   a membrane electrode assembly interposed between said separator layers, said membrane electrode assembly comprising a pair of electrodes and an ion exchange membrane interposed therebetween, said electrodes having electrocatalyst associated therewith defining an electrochemically active area;
   each of said separator layers comprising a reactant portion superposing said electrochemically active area and a remaining portion not superposing said electrochemically active area;
   each of said separator layers comprising a reactant stream inlet, a reactant stream outlet and at least one reactant stream passage in fluid communication with one of said electrodes for directing a fluid reactant stream from said reactant stream inlet to said reactant stream outlet, a predominant portion of said at least one reactant stream passage disposed in said reactant portion;
   at least one of said separator layers further comprising at least one coolant stream inlet, at least one coolant stream outlet and at least one coolant stream passage for directing a coolant stream from said at least one coolant stream inlet to said at least one coolant stream outlet, wherein said at least one coolant stream passage is disposed only in said remaining portion and is fluidly isolated from said at least one reactant stream passage.

2. The electrochemical fuel cell assembly of claim 1 wherein said at least one of said separator layers comprises a substantially fluid impermeable plate having oppositely facing major planar surfaces.

3. The electrochemical fuel cell assembly of claim 2 wherein said at least one coolant stream passage extends substantially parallel to said major planar surfaces.

4. The electrochemical fuel cell assembly of claim 3 wherein said at least one coolant stream passage comprises at least one channel formed in one of said surfaces of said plate.

5. The electrochemical fuel cell assembly of claim 4 wherein said at least one reactant stream passage comprises at least one channel formed in one of said surfaces of said plate.

6. The electrochemical fuel cell assembly of claim 3 wherein said at least one of said separator layers further comprises a porous layer interposed between said plate and said membrane electrode assembly and said at least one reactant stream passage comprises the interstices of said porous layer.

7. The electrochemical fuel cell assembly of claim 6 wherein said at least one coolant stream passage comprises at least one coolant stream conduit extending through said porous layer fluidly connecting said coolant stream inlet and said coolant stream outlet.

8. The electrochemical fuel cell assembly of claim 2 wherein said at least one coolant stream passage extends through said plate from one of said major planar surfaces to the other of said major planar surfaces, said at least one coolant stream passage extending substantially perpendicular to said major planar surfaces.

9. The electrochemical fuel cell assembly of claim 8 wherein said remaining portion comprises a plurality of noncontiguous regions.

10. An electrochemical fuel cell stack comprising a plurality of fuel cells and a separator layer interposed between each pair of adjacent fuel cells, each of said fuel cells comprising:
    a membrane electrode assembly comprising a pair of electrodes and an ion exchange membrane interposed therebetween, said electrodes having electrocatalyst associated therewith defining an electrochemically active area;
    each of said separator layers comprising a reactant portion superposing said electrochemically active area of said pair of fuel cells and a remaining portion not superposing said electrochemically active area;
    each of said separator layers comprising a first reactant stream inlet, a first reactant stream outlet and at least one first reactant stream passage in fluid communication with an electrode of a first fuel cell of said pair of fuel cells, for directing a first reactant stream from said first reactant stream inlet to said first reactant stream outlet, a predominant portion of said at least one first reactant stream passage disposed in said reactant portion;
    each of said separator layers further comprising a second reactant stream inlet, a second reactant stream outlet and at least one second reactant stream passage, in fluid communication with an electrode of a second fuel cell of said pair of fuel cells, for directing a second reactant stream from said second reactant stream inlet to said second reactant stream outlet, a predominant portion of said at least one second reactant stream passage disposed in said reactant portion;
    each of said separator layers further comprising at least one coolant stream inlet, at least one coolant stream outlet and at least one coolant stream passage for directing a coolant stream from said at least one coolant stream inlet to said at least one coolant stream outlet, wherein said at least one coolant stream passage is disposed only in said remaining portion and is fluidly isolated from said first and second reactant stream passages.

11. The electrochemical fuel cell stack of claim 10 wherein each of said separator layers comprises a substantially fluid impermeable plate having oppositely facing major planar surfaces.

12. The electrochemical fuel cell stack of claim 11 wherein said at least one coolant stream passage extends substantially parallel to said major planar surfaces.

13. The electrochemical fuel cell stack of claim 12 wherein said at least one coolant stream passage comprises at least one channel formed in at least one of said surfaces of said plate.

14. The electrochemical fuel cell stack of claim 13 wherein said at least one first reactant stream passage comprises at least one channel formed in one of said surfaces of said plate and said at least one second reactant stream passage comprises at least one channel formed in said oppositely facing surface of said plate.

15. The electrochemical fuel cell stack of claim 14 wherein said at least one coolant stream passage comprises at least one channel formed in each of said surfaces of said plate.

16. The electrochemical fuel cell stack of claim 12 wherein said separator layer further comprises a porous layer interposed between said plate and said first fuel cell, and said at least one first reactant stream passage comprises the interstices of said porous layer.

17. The electrochemical fuel cell stack of claim 16 wherein said at least one coolant stream passage comprises at least one coolant stream conduit extending through said porous layer fluidly connecting said coolant stream inlet and said coolant stream outlet.

18. The electrochemical fuel cell stack of claim 11 wherein said at least one coolant stream passage extends through said plate from one of said major planar surfaces to the other of said major planar surfaces, said at least one coolant stream extending substantially perpendicular to said major planar surfaces.

19. The electrochemical fuel cell stack of claim 18 wherein said remaining portion comprises a plurality of noncontiguous regions.

20. The electrochemical fuel cell stack of claim 10 wherein said coolant is a liquid.

21. The electrochemical fuel cell stack of claim 10 wherein said coolant is a gas.

22. An electrochemical fuel cell plaque assembly comprising:
- a pair of separator layers;
- a plurality of juxtaposed fuel cells interposed between said separator layers, each of said fuel cells comprising a membrane electrode assembly comprising a pair of electrodes and an ion exchange membrane interposed therebetween, said electrodes having electrocatalyst associated therewith defining an electrochemically active area;
- each of said separator layers comprising a reactant portion comprising a plurality of noncontiguous regions superposing said plurality of electrochemically active areas and a remaining portion not superposing any of said electrochemically active areas;
- each of said separator layers comprising at least one reactant stream inlet, at least one reactant stream outlet and a plurality of reactant stream passages each in fluid communication with at least one of said plurality of electrodes for directing a fluid reactant stream from said at least one reactant stream inlet to said at least one reactant stream outlet, a predominant portion of each of said plurality of reactant stream passages disposed in said reactant portion;
- at least one of said separator layers further comprising at least one coolant stream inlet, at least one coolant stream outlet and at least one coolant stream passage for directing a coolant stream from said at least one coolant stream inlet to said at least one coolant stream outlet, wherein said at least one coolant stream passage is disposed only in said remaining portion and is fluidly isolated from said at least one reactant stream passage.

23. The electrochemical fuel cell plaque assembly of claim 22 wherein said at least one separator layer comprises a substantially fluid impermeable plate having oppositely facing major planar surfaces.

24. The electrochemical fuel cell plaque assembly of claim 23 wherein said at least one coolant stream passage comprises at least one channel formed in one of said surfaces of said plate.

25. The electrochemical fuel cell plaque assembly of claim 24 wherein said at least one reactant stream passage comprises at least one channel formed in one of said surfaces of said plate.

26. An electrochemical fuel cell stack comprising a plurality of fuel cell plaque assemblies and a separator layer interposed between each pair of adjacent fuel cell plaque assemblies, each of said fuel cell plaque assemblies comprising:
- a plurality of juxtaposed fuel cells interposed between said separator layers, each of said fuel cells comprising a membrane electrode assembly comprising a first electrode and a second electrode and an ion exchange membrane interposed therebetween, each of said electrodes having electrocatalyst associated therewith defining an electrochemically active area;
- each of said separator layers comprising a reactant portion comprising a plurality of noncontiguous regions superposing said plurality of electrochemically active areas and a remaining portion not superposing any of said electrochemically active areas;
- each of said separator layers comprising at least one first reactant stream inlet, at least one first reactant stream outlet and a plurality of first reactant stream passages each in fluid communication with at least one of said first electrodes of a first fuel cell assembly of said pair of adjacent assemblies, for directing a first fluid reactant stream from said first reactant stream inlet to said first reactant stream outlet, a predominant portion of said at least one first reactant stream passage disposed in said reactant portion;
- each of said separator layers further comprising at least one second reactant stream inlet, at least one second reactant stream outlet and a plurality of second reactant stream passages each in fluid communication with at least one of said second electrodes of a second fuel cell assembly of said pair of adjacent assemblies, for directing a second fluid reactant stream from said second reactant stream inlet to said second reactant stream outlet, a predominant portion of said at least one second reactant stream passage disposed in said reactant portion;
- each of said separator layers further comprising at least one coolant stream inlet, at least one coolant stream outlet and at least one coolant stream passage for directing a coolant stream from said at least one coolant stream inlet to said at least one coolant stream outlet, wherein said at least one coolant stream passage is disposed only in said remaining portion and is fluidly isolated from said at least one first and said at least one second reactant stream passage.

27. The electrochemical fuel cell stack of claim 26 wherein each of said separator layers comprises a substantially fluid impermeable plate having oppositely facing major planar surfaces.

28. The electrochemical fuel cell stack of claim 27 wherein said at least one coolant stream passage comprises at least one channel formed in one of said surfaces of said plate.

29. The electrochemical fuel cell stack of claim 28 wherein said at least one first reactant stream passage comprises at least one channel formed in one of said surfaces of said plate.

* * * * *